United States Patent Office 3,606,763
Patented Sept. 21, 1971

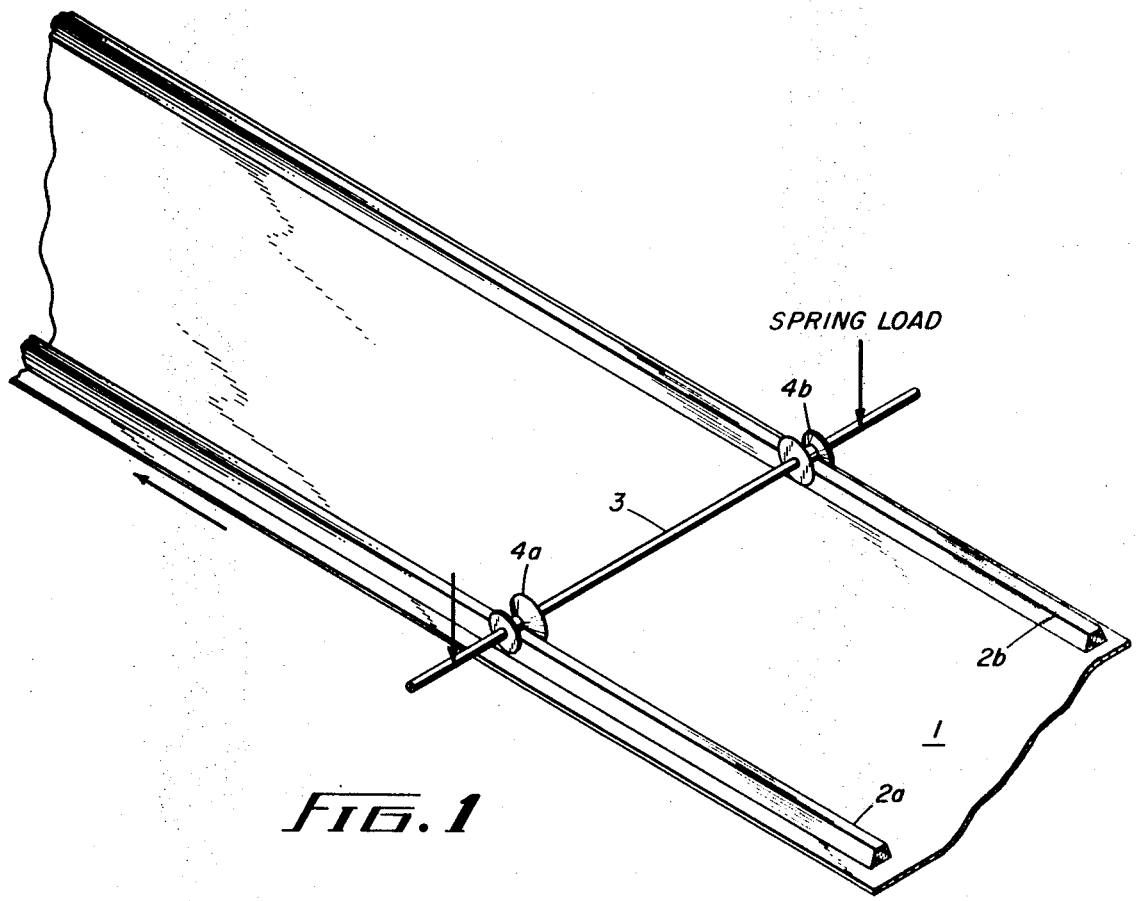
FIG. 1
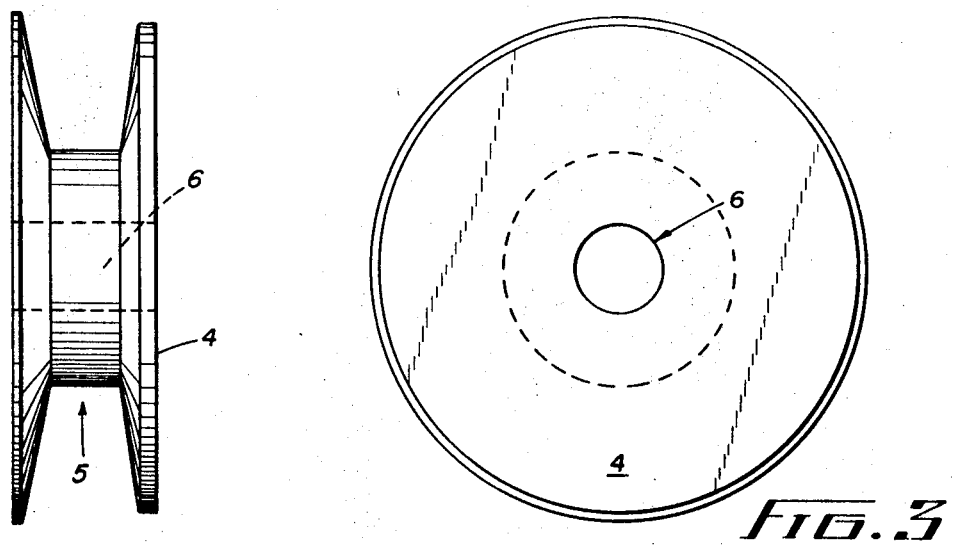
FIG. 2
FIG. 3
INVENTOR.
LYNDON G. BEVINS
BY Bruno P. Struzzi
ATTORNEY

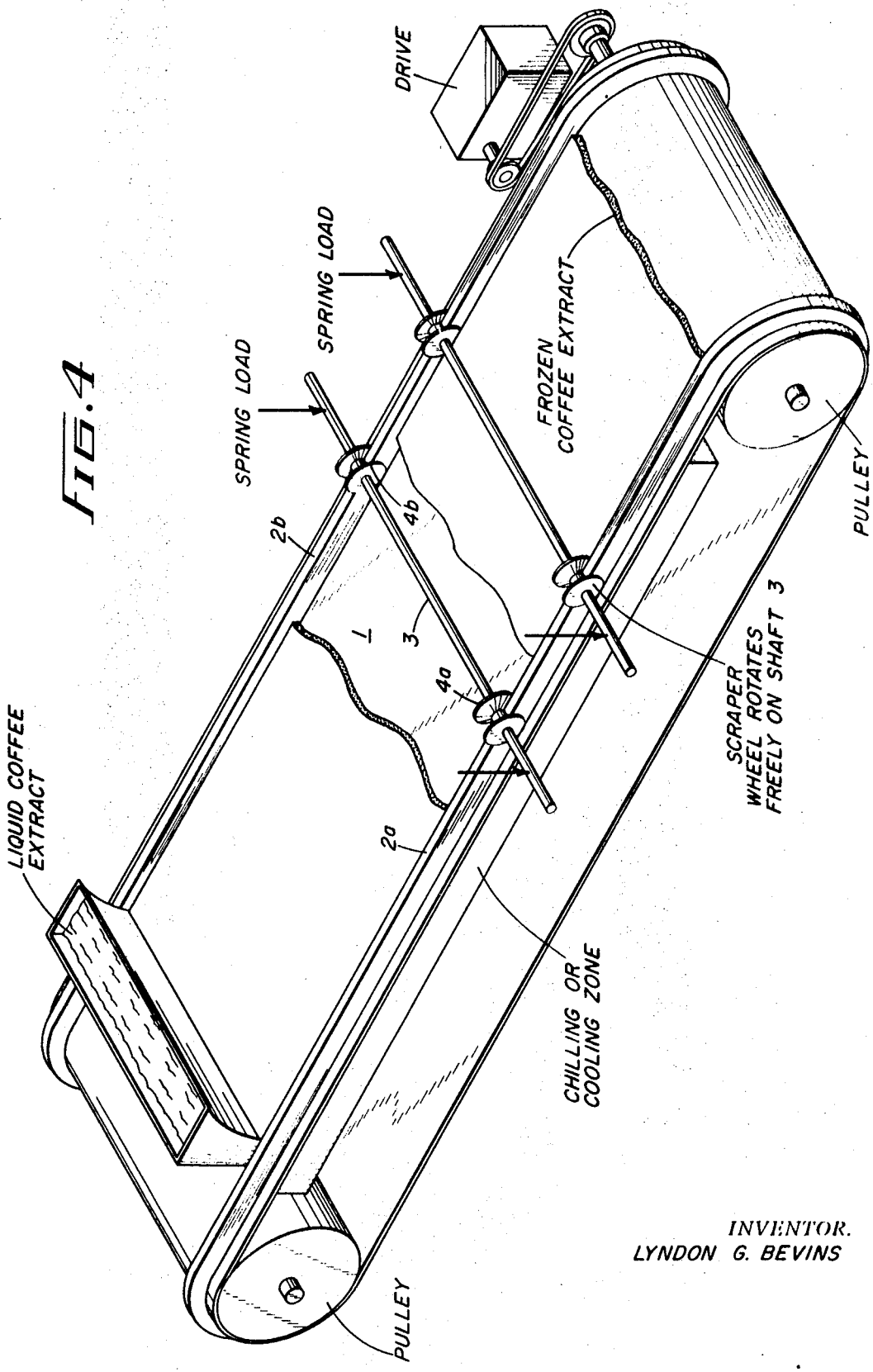

3,606,763
METHOD OF FREEZING LIQUID ON A BELT AND APPARATUS FOR ACCOMPLISHING SAME
Lyndon Gene Bevins, Houston, Tex., assignor to General Foods Corporation, White Plains, N.Y.
Filed May 28, 1969, Ser. No. 828,622
Int. Cl. F25c 1/12
U.S. Cl. 62—72                        8 Claims

ABSTRACT OF THE DISCLOSURE

It has been discovered that the efficiency of a process wherein extract is frozen on a continuous belt can be greatly increased by mechanically separating the extract from the side skirts used to contain the extract. The separation is performed when the extract is in a semi-solid state. The process of this invention minimizes product loss and prevents costly shutdowns due to torn side skirts. A scraper wheel has been designed which effectively accomplishes the mechanical separation.

BACKGROUND OF THE INVENTION

This invention relates to the freezing of liquid solutions on a continuous freezing belt. More particularly, it concerns the freezing of extracts such as coffee and tea extracts.

The rapidly growing demand for freeze-dried products has led to ever increasing demands for more efficient means of performing all of the operations necessary to prepare a product for freeze drying. Obviously, one of the critical steps in preparing an extract for freeze drying is the step of freezing the liquid extract.

When freezing coffee or tea extracts the most common method in use today is to spread the liquid extract on a continuous belt and convey the extract through a chilling zone wherein the extract is frozen into a solid slab. In order to contain the liquid extract on the belt, side skirts have been attached on the edges of the belt, thus forming a continuous trough for the extract.

The use of side skirts has been troublesome in several ways. First, the extract after freezing tends to stick to the side skirts and the product remaining on the side skirt at the discharge end of the belt represents a significant product loss. Attempts to minimize this problem by coating the side skirt with a non-sticking surface, such as the continuous application of liquid silicone, have only been mildly successful.

The second major problem encountered is tearing of the side skirt or the bond between the belt and the side skirt due to the pressure exerted against the side skirt as the extract freezes. Many attempts at strenghening the side skirt, such as bolting the side skirt to the belt or clamping the side skirt at spaced intervals, have proven unsuccessful as means of preventing side skirt breakage. The down time which occurs due to torn side skirts is costly in that significant periods are required to repair the damaged side skirt before normal operations can be resumed.

SUMMARY OF THE INVENTION

It has now been discovered that side skirt breakage and product losses due to frozen extract sticking to the side skirts can be minimized by mechanically separating the extract from the side skirt while the extract is in a semi-solid state. Further, it has been discovered that the mechanical separation can be effectively achieved by using a scraper wheel designed to fit over the side skirt as a railroad wheel fits over the rail. The edges of the wheel extend down along the side of the skirt and effectively move the semi-solid extract away from the side skirt as the belt and side skirt travel past the scraper wheel. The scraper wheel is held firmly against the side skirt by a spring loaded shaft. The shaft passes through a hole at the center of the wheel wherein the clearance is sufficient to allow the scraper wheel to freely rotate around the shaft. The tension on the shaft and the hole size are adjusted to permit the wheel to move along the shaft as the belt tracks from side to side, so that the scraper wheel rides on the side skirt and does not tend to tear the side skirt as it tracks off center.

BRIEF DESCRIPTION OF THE DRAWINGS

FIG. 1 is a partial view of a continuous freezing belt with the scraper wheels of this invention mounted and resting on the side skirts.

FIG. 2 is an end view of the scraper wheel showing how the center is contoured to conform to the shape of the side skirt.

FIG. 3 is a side view of the scraper wheel.

FIG. 4 is a view of a conventional freezing belt employing the scraper wheels of this invention.

DESCRIPTION OF THE PREFERRED EMBODIMENT

FIG. 1 shows a section of continuous belt 1 with side skirts 2A, 2B bonded to the edges of the belt. The scraper wheels 4A, 4B are mounted on a spring loaded shaft 3 such that they are resting firmly on the side skirts.

The shaft passes through a hole at the center of the wheel shown as 6 in FIG. 2 and FIG. 3, and extends perpendicular to the width of the freezing belt. The hole 6 is sized and the tension adjusted such that as the belt tracks from side to side the scraper wheels can move along the shaft 3 with the side skirts. The peripheral surface of the wheels (shown as 5 in FIG. 2) are contoured to conform to the contour of the side skirts so that the scraper wheel will fit readily onto the side skirt. It is readily apparent from FIG. 2 that the edges of the wheel 4 will extend down toward the surface of the continuous belt and the edge between the side skirt and the extract is the portion of the wheel that actually moves the extract away from the side skirt.

When extract is carried through the chilling zone ice freezes out gradually, until the extract is chilled to below its eutectic point, at which time the freezing is completed. As the ice content of the extract increases, the viscosity of the partially frozen extract increases. At a point during the freezing cycle the extract begins to behave as a semi-solid, that is, while it is not completely frozen it is sufficiently viscous to retain its shape and does not run freely as a liquid. This semi-solid state lasts for several minutes in a freezing cycle which may take 15-minute total time and in a given system it is relatively easy to determine which portion along the travel of the belt will contain the extract in the semi-solid state. It is in this portion of the belt that the scraper wheels are mounted onto the side skirts. As the belt and side skirts pass beneath the scraper wheel, the scraping edge of the wheel mechanically pushes the extract away from the side skirt and toward the center of the belt.

The scraper wheels of this invention were used on a continuous Sandvik stainless steel freezing belt on which coffee extract was being frozen. The diameter of the wheels were 3⅜ inches and the over all width of the wheel was 1 inch. The peripheral edge was contoured to the shape of the rubber side skirts which were bounded on either edge of the freezing belt as shown in FIGS. 2 as 5. The spring loaded shaft was ⅝ of an inch in diameter and the hole at the center of the wheel was 21/32 of an inch in diameter. It was found that by using the scraper wheels, a channel was formed between the semi-solid extract and the side skirt which essentially eliminated product losses due to frozen extract sticking to the side skirts. It was also found that the frequence of shutdowns due to torn side skirts was drastically reduced. Without the scraper wheel of this invention, one or two shutdowns per week were not uncommon. With the scraper wheel of this invention a shutdown due to torn side skirts was not encountered in three months of continuous operation.

In order to further improve the efficiency of the scraper wheels it is anticipated that several wheels can be installed on each side skirt, spaced along the path of travel of the freezing belt. Successive wheels would then mechanically separate any extract which may tend to run toward the side skirt after the initial separation. A further advantage of the multiple wheel setup would be the fact that the freezing profile could be changed, thus changing the location of the semi-solid extract, without having to reposition the mounted scraper wheels, as one or more of the successive wheels would still be in the freezing zone wherein the extract was in a semi-solid state.

The foregoing explanation was for illustrative purposes only and the scope of the invention is intended to be limited only by the appended claims.

What is claimed is:

1. A method of freezing liquid solutions comprising spreading the liquid on a continuous belt; said belt having side skirts to retain the liquid while it is in a liquid state, the side skirts being mounted on either edge of the upper surface of the belt; the belt carrying the liquid through a chilling zone, removing heat from the liquid in the chilling zone to freeze said liquid; and discharging the frozen liquid from said belt; said liquid becoming progressively more viscous at is passes through the chilling zone, the partially frozen liquid having a semi-solid consistency before it is completely frozen; mechanically separating the semi-solid liquid from the side skirt, thus minimizing product losses due to liquid freezing onto the side skirts and preventing side skirt breakage due to expansion of the frozen liquid against the side skirts, said mechanical separation achieved by providing a scraper between the side skirt and the semi-solid liquid, said scraper being in the form of a wheel, the peripheral surface of said wheel being contoured to fit over said side skirt, the edges of the scraper wheel extending down toward the freezing belt on either side of the side skirt, the edge of the wheel between the side skirt and the liquid pushing the semi-solid liquid away from the side skirt.

2. The method of claim 1 wherein several scraper wheels are spaced along the length of the freezing belt, successive scraper wheels pushing away any liquid which flows toward the side skirt after the initial separation.

3. The method of claim 4 wherein the extract is coffee extract.

4. The method of claim 1 wherein the liquid is an extract.

5. In an apparatus for freezing liquids confined by continuous side skirts and separating the frozen liquid from the side skirts comprising a pair of pulleys, a relatively wide and long, endless metal belt contacting and extending around said pulleys, means for driving said belt to continuously advance the belt, side skirts affixed to the upper peripheral sides of the belt and extending continuously along said sides, means for applying liquid to be treated to the belt adjacent to one of said pulleys, means for cooling the belt effective to freeze the liquid being treated; the improvement comprising mechanically scraping semi-solid liquid on the freezing belt from the freezing belt side skirts by providing a scraper, said scraper being in the form of a wheel, the peripheral surface of said wheel being contoured to fit over said side skirt, the edges of the scraper wheel extending down toward the freezing belt on either side of the side skirt, the edge of the wheel between the side skirt and the fluid filled portion of the belt maintained proximate to the belt effective to contact liquid on the belt and push the semi-solid liquid away from the side skirt.

6. The apparatus of claim 5 wherein the scraper wheel is mounted on a spring loaded shaft, said shaft holding the scraper wheel against the upper surface of the side skirt, the shaft extending perpendicular to the length of the belt and passing through a hole found at the center of said scraper wheel, the diameter of the hole and the pressure applied by the spring loaded shaft being adjusted such that the scraper wheel rotates freely on the shaft as the belt and side skirt travel past the scraper wheel; the clearance around the shaft being sufficient such that the scraper wheel can slide along the shaft when the belt tracks side to side, thus allowing the scraper wheel to remain centered on the side skirt.

7. The apparatus of claim 6 wherein the shaft extends across the width of the belt and two scraper wheels are mounted on the shaft, one scraper wheel pressing onto each of the side skirts.

8. The apparatus of claim 5 wherein several scraper wheels are mounted along the length of the freezing belt, successive scraper wheels pushing away any extract which flows toward the side skirt after the initial separation.

References Cited

UNITED STATES PATENTS

| | | | |
|---|---|---|---|
| 2,124,233 | 7/1938 | Martin | 62—303X |
| 3,253,420 | 5/1966 | De George | 62—345X |
| 3,280,590 | 10/1966 | Larsson | 62—345X |

WILLIAM E. WAYNER, Primary Examiner

U.S. Cl. X.R.

62—345; 165—94